United States Patent [19]

Sakai

[11] Patent Number: 4,537,163
[45] Date of Patent: Aug. 27, 1985

[54] INTAKE PASSAGES IN CYLINDER HEADS OF AN OPPOSED SIX-CYLINDER ENGINE

[75] Inventor: Tatsuo Sakai, Tokyo, Japan

[73] Assignee: Fuji Jukogyo Kabushiki Kaisha, Tokyo, Japan

[21] Appl. No.: 558,639

[22] Filed: Dec. 6, 1983

[30] Foreign Application Priority Data

Dec. 7, 1982 [JP] Japan .................. 57-214144

[51] Int. Cl.³ .............................. F02F 1/42
[52] U.S. Cl. .................. 123/52 MC; 123/56 AC; 123/85; 123/193 H
[58] Field of Search ......... 123/52 M, 51 BD, 52 MB, 123/54 B, 56 AC, 56 R, 56 BC, 59 EC, 85, 193 H, 193 CH, 193 R, 59 R, 59 A, 55 VS, 52 MV, 56 A, 56 AA, 56 AB, 52 MC

[56] References Cited

U.S. PATENT DOCUMENTS 1,695,186 12/1928 Good ................................. 123/85
1,768,551 7/1930 Fekete ........................ 123/52 MC
2,506,250 5/1950 Taub ............................ 123/188 M
2,664,864 1/1954 Ernest ........................ 123/52 MC
2,713,852 7/1955 Trout .......................... 123/56 AC
2,974,655 3/1961 Kolbe .......................... 123/56 AC
4,086,763 5/1978 Matsushita et al. ........... 123/193 H Primary Examiner—Craig R. Feinberg
Assistant Examiner—David A. Okonsky
Attorney, Agent, or Firm—Martin A. Farber

[57] ABSTRACT

Intake passage in cylinder heads of an opposed six-cylinder engine. The cylinder heads are disposed on opposite sides of a crankcase including cylinder blocks.

Three cylinders in each cylinder head are arranged in firing order. Intake valves and exhaust valves in each cylinder are disposed in the same arrangement at every cylinder so that the distance between the intake valves are equal to each other, and an intake passage in each cylinder head is so formed as to communicate intake valves with an opening. The opening is located at a position between two cylinders which are faster in firing order than the other cylinder.

3 Claims, 6 Drawing Figures

னgine.
INTAKE PASSAGES IN CYLINDER HEADS OF AN OPPOSED SIX-CYLINDER ENGINE

BACKGROUND OF THE INVENTION

The present invention relates to intake passages in cylinder heads of an opposed six-cylinder engine.

FIG. 1 schematically shows an opposed six-cylinder engine.

The opposed six-cylinder engine comprises a crankcase A including a pair of cylinder blocks B formed on opposite sides thereof and cylinder heads 1 and 1' secured to the cylinder blocks. Three cylinders are formed in each cylinder block.

FIG. 2 shows one of the conventional cylinder heads as viewed from the inside thereof. The cylinder head has combustion chambers 2a for a No. 1 cylinder, 2b for a No. 3 cylinder and 2c for a No. 5 cylinder. Intake valves 3a, 3b and 3c and exhaust valves 4a, 4b and 4c are provided for respective combustion chambers in the cylinder head. A siamese intake passage 6ab is formed in the cylinder head to communicate intake valve ports of the intake valves 3a and 3b with a single opening 5ab. The valve port of the intake valve 3c is communicated by a single passage 6c with an opening 5c. The opening 5ab and 5c are communicated with an intake manifold 10 (FIG. 1). Similarly, valve ports of the exhaust valves 4a and 4b are communicated with an opening Bab by a siamese exhaust passage 7ab and the port of the exhaust valve 4c is communicated with an opening 8c by a passage 7c.

In the other cylinder head 1', intake and exhaust passages are formed in the same manner as the cylinder head 1. FIG. 3 shows both cylinder heads disposing in adjacent positions for the convenience of explanation. In the cylinder head 1', a combustion chamber 2c' for the No. 2 cylinder, combustion chamber 2b' for the No. 4 cylinder and combustion chamber 2a' for the No. 6 cylinder are formed. Intake passages 6ab' and 6c' and exhaust passages 7ab' and 7c' are arranged in symmetry with respect to an axis for balancing the cylinder heads.

In such an arrangement, since intake valves 3a and 3c are disposed at outermost positions, the length of each intake passage becomes long in order to equalize the length of one of the passages with the length of the others. Therefore, the amount of induced air becomes small, which causes a reduction of combustion efficiency.

On the other hand, the intake strokes of the No. 1 cylinder and No. 3 cylinder overlap with each other as shown in FIG. 6. Since both cylinders are communicated by the siamese intake passage 6ab, a large amount of air is induced into the No. 3 cylinder, which fires later in the firing order than the No. 1 cylinder, by the inertia of the air induced into the No. 1 cylinder. Further, during the overlapping of the exhaust stroke and the intake stroke of the No. 1 cylinder, residual gases in the exhaust passage of the No. 3 cylinder during the exhaust stroke are induced into the No. 1 cylinder. Therefore, combustion in No. 1 is unequalized in idling operation of the engine. When the No. 6 cylinder begins to induce the air after No. 4, the No. 6 cylinder is the same as the No. 1 cylinder in deterioration of combustion.

SUMMARY OF THE INVENTION

The object of the present invention is to provide intake passages in cylinder heads of an opposed six-cylinder engine which equally induces a large amount of air into each cylinder so as to improve combustion efficiency.

According to the present invention, there are provided cylinder heads of an opposed six-cylinder engine of the type of which said cylinder heads are disposed on opposite sides of a crankcase including cylinder blocks each having three cylinders, comprising: three cylinders being arranged in firing order; intake valves provided in each cylinder head; exhaust valves provided in each cylinder head; said intake valves and exhaust valves in each cylinder being disposed in the same arrangement at every cylinder so that the distance between the intake valves are equal to each other; each cylinder head being formed with an intake passage and an opening, said intake passage communicates each intake valve with said opening, said opening being located at a central position between two intake valves of cylinders which are faster in firing order than the other cylinder.

The other objects and features of this invention will be apparently understood from the following description with reference to the accompanying drawings.

DETAILED DESCRIPTION OF THE PREFERRED EMBODIMENT

Figure 1:
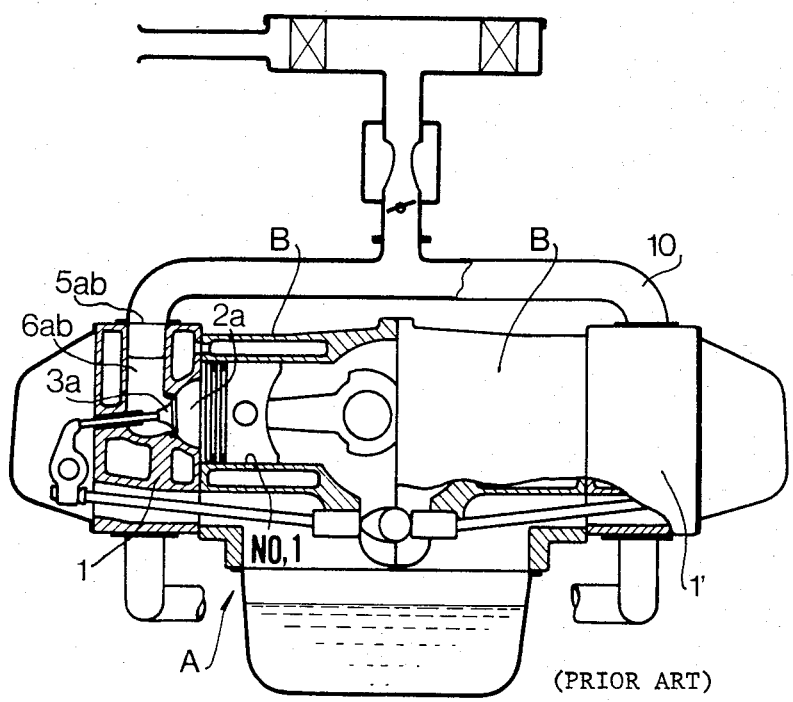
FIG. 1 schematically shows an example of an opposed six-cylinder engine.
Figure 2:
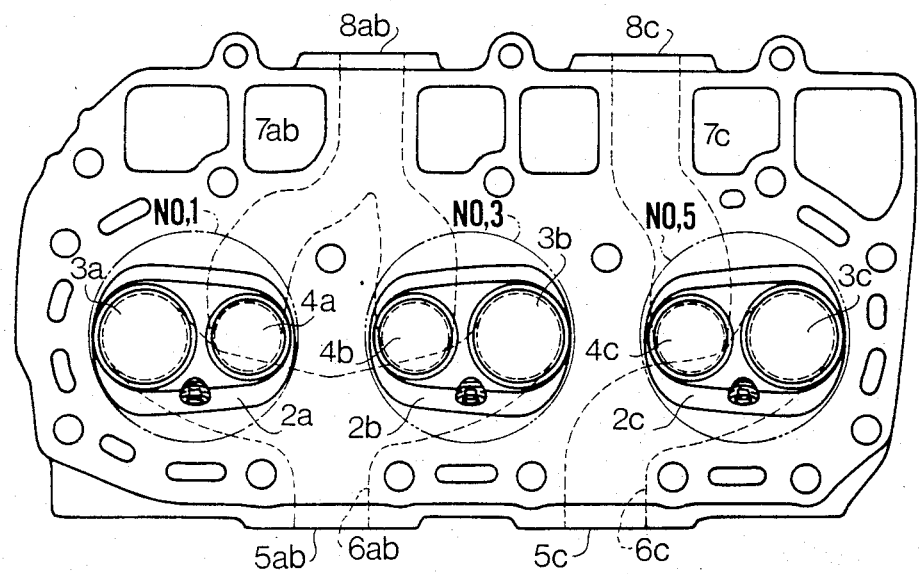
FIG. 2 shows a cylinder head of a conventional engine as viewed from the inside thereof.
Figure 3:
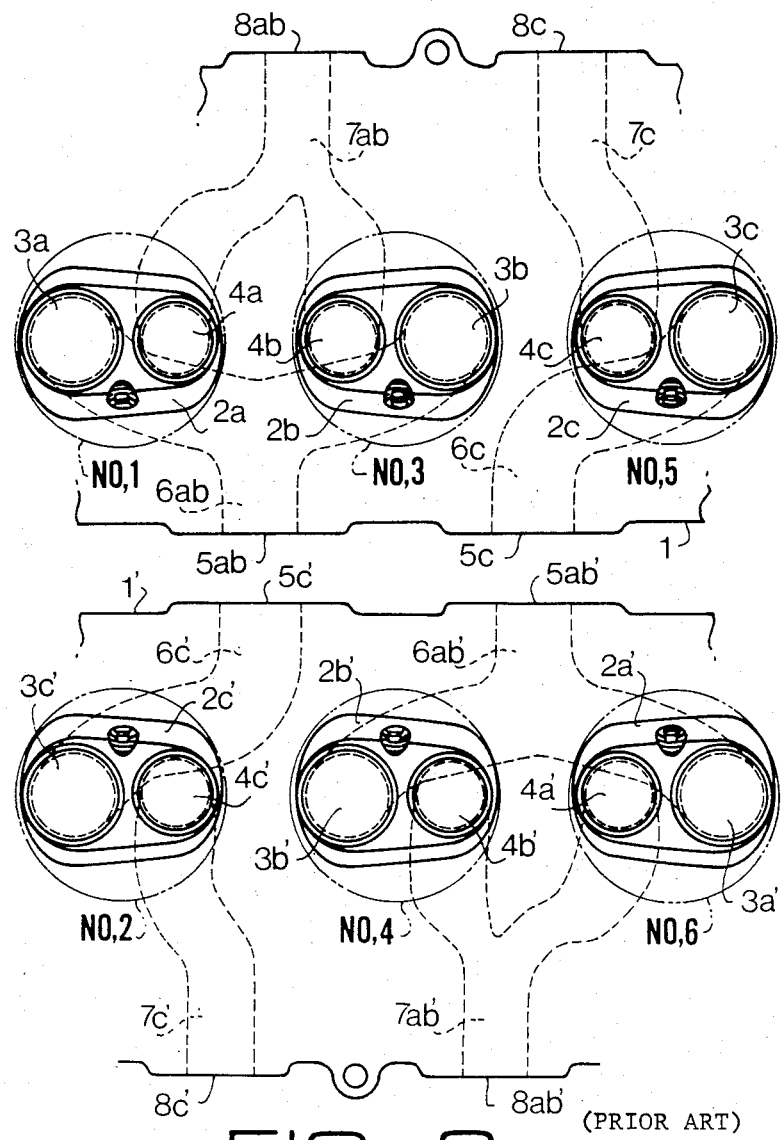
FIG. 3 shows cylinder heads of a six-cylinder engine.
Figure 4:
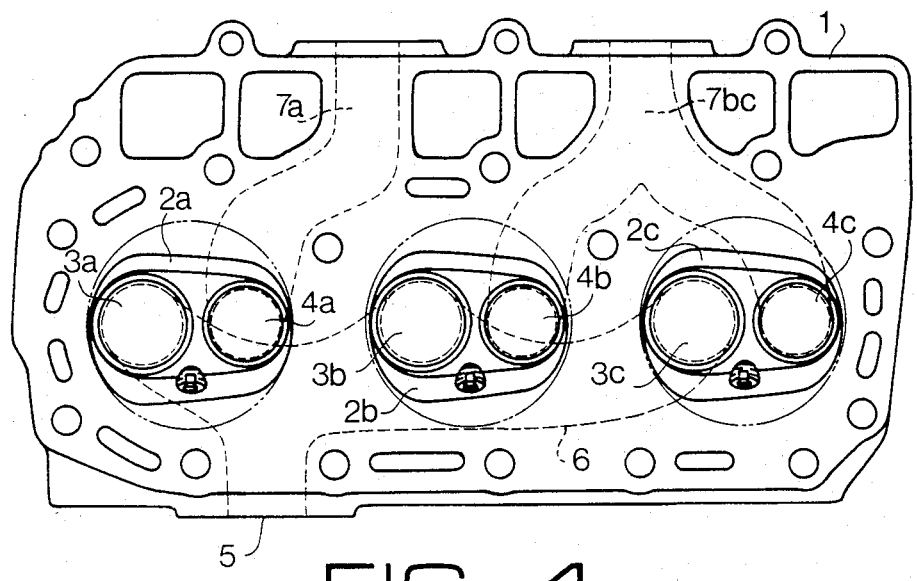
FIGS. 4 and 5 show an embodiment of the present invention.
Figure 5:
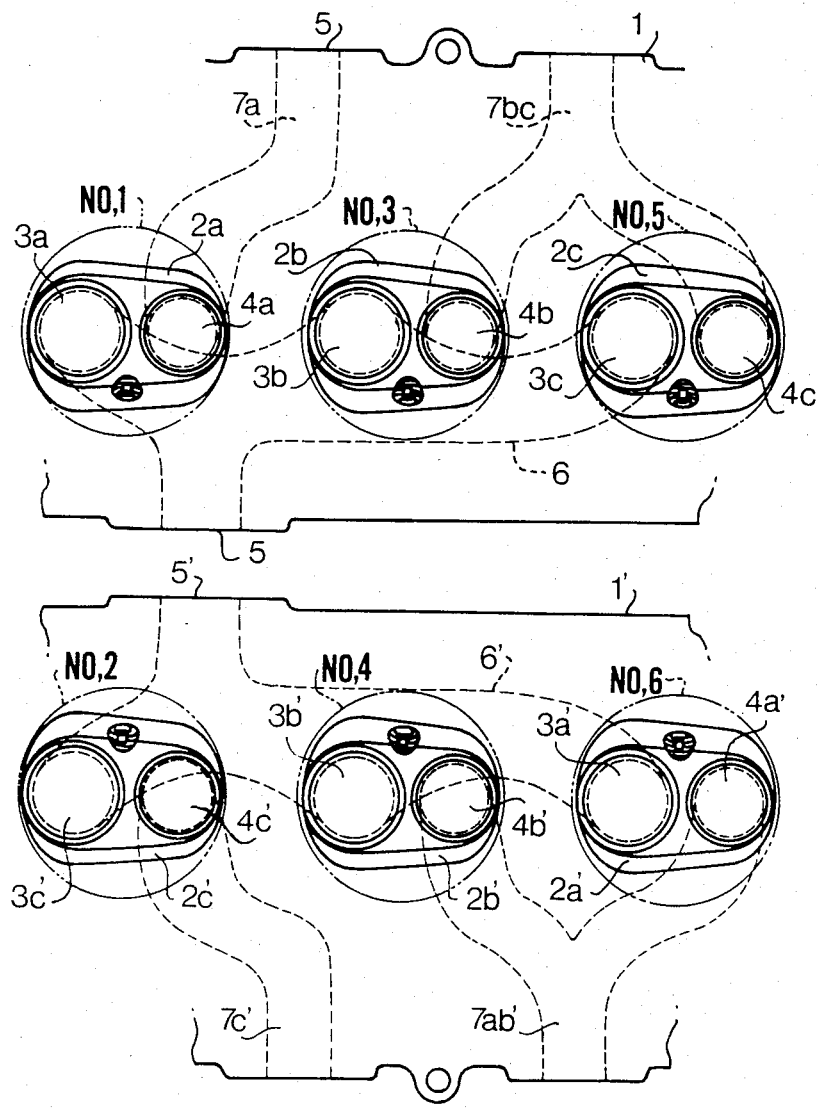
Figure 6:
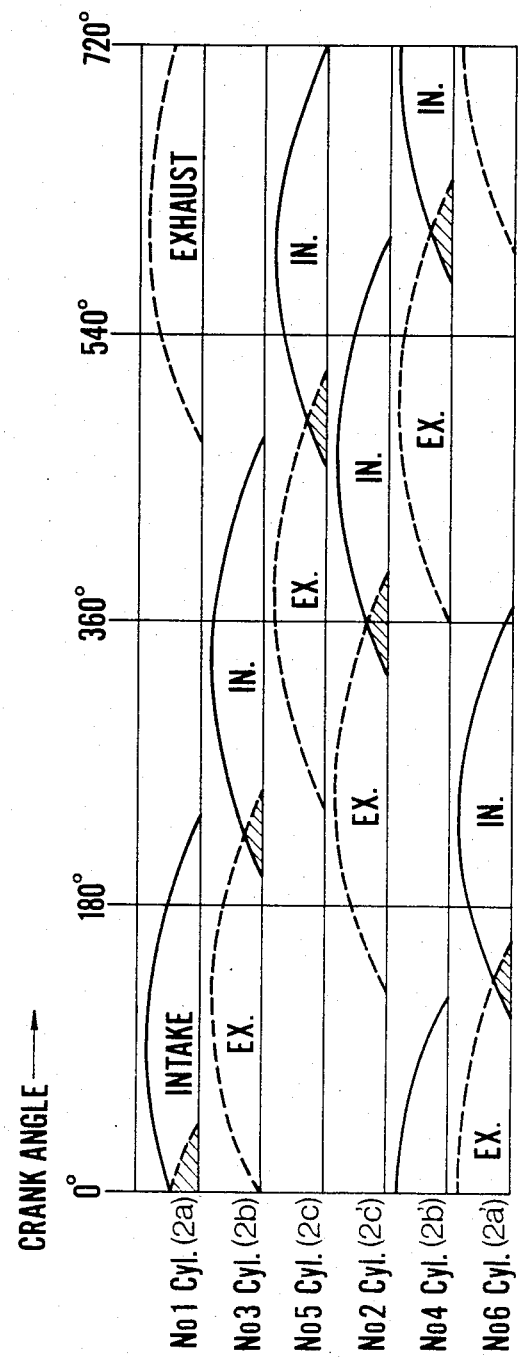
FIG. 6 is a timing chart showing intake strokes and exhaust strokes of the six-cylinder engine.

Referring to FIGS. 4 and 5, intake valves 3a to 3c and exhaust valves 4a to 4c in the cylinder head 1 are disposed in the same arrangement or order at every cylinder, so that the distances between the intake valves are respectively equal, and also the distances between the exhaust valves are equal, respectively. A common intake passage 6 is provided in the cylinder head 1 for the intake valves 3a to 3c, so that the length of the passage between adjacent intake valves 3a and 3b is equal to the length of the passage between the intake valves 3b and 3c. As seen from the drawings, the length of the passage between the adjacent intake valves 3a and 3b of the present invention is shorter than that of FIG. 2. If the firing order of the engine is No. 1→ No. 6→ No. 3→ No. 2→ No. 5→ No. 4, a single opening 5 is provided between the intake valve 3a of the No. 1 cylinder and intake valve 3b of the No. 3 cylinder. The reason is as follows.

In such an arrangement, the distance between the intake valve 3c of the No. 5 cylinder and the opening 5 becomes long. However, the direction of intake air flow to the intake valve 3c is the same as the intake air flow to the intake valve 3b of No. 3 cylinder. Therefore, the amount of intake air to the No. 5 cylinder is increased by the inertia effect of the intake air to the intake valve 3b during the overlapping of the intake strokes of both cylinders, so that a decrease of intake air to the No. 5 cylinder can be compensated.

On the contrary, exhaust passages 7a and 7bc are suitably arranged. In the embodiment, the exhaust valve 4a is communicated by a passage 7a and exhaust valves 4b and 4c are communicated by a siamese passage 7bc.

As shown in FIG. 5, passages in the cylinder head 1' are arranged in similar manner as in the cylinder head 1. In the embodiment, an opening 5' is provided between the No. 2 cylinder and the No. 4 cylinder.

From the foregoing, it will be understood that the present invention provides intake passsages for an opposed six-cylinder engine which can increase the amount of intake air to improve the combustion efficiency.

While the presently preferred embodiment of the present invention has been shown and described, it is to be understood that this disclosure is for the purpose of illustration and that various charges and modifications may be made without departing from the spirit and scope of the invention as set forth in the appended claims.

What is claimed is:

1. In cylinder heads of an opposed six-cylinder engine of the type wherein said cylinder heads are disposed on opposite sides of a crankcase including cylinder blocks, each of the latter having three cylinders, the improvement wherein said three cylinders of each block being arranged in firing order;

an intake valve provided in each cylinder head adjacent each of said cylinders respectively communicating therewith;

an exhaust valve provided in each cylinder head adjacent each of said cylinders respectively communicating therewith;

said intake valves and said exhaust valves communicating with each said cylinder being disposed in the same arrangement with respect to said each cylinder so that in each of said cylinder heads respectively the distances between adjacent of the intake valves are equal to each other;

each said cylinder head being formed with an intake passage and an opening into said intake passage, said intake passage in each said cylinder head communicates each of said intake valves in each said cylinder head with said opening in each said cylinder head respectively, said opening in each said cylinder head respectively being located at a central position between two associated of said intake valves which communicate with two of said three cylinders in the associated cylinder block which are earlier in firing order than the other of said three cylinders in said associated cylinder block.

2. The cylinder heads according to claim 1 wherein said three cylinders in one of said cylinder blocks comprises No. 1, No. 3 and No. 5 cylinders, and said associated opening is positioned between said No. 1 and No. 3 cylinders.

3. The cylinder heads according to claim 1 wherein adjacent of said three cylinders in each of said cylinder blocks have overlapping intake strokes.

* * * * *